United States Patent
Wiesemann et al.

(10) Patent No.: US 6,523,843 B2
(45) Date of Patent: Feb. 25, 2003

(54) BEARING FOR A STABILIZER OF A WHEEL SUSPENSION FOR MOTOR VEHICLES AND METHOD OF MAKING SAME

(75) Inventors: Stefan Wiesemann, Esslingen (DE); Norbert Schote, Ammerbuch (DE); Hartwig Naploszek, Essen (DE); Thomas Geisler, Wuppertal (DE)

(73) Assignees: Dr. Ing. h.c.F. Porsche AG, Weissach (DE); Vorwerk & Sohn GmbH & Co. KG, Wuppertal Erfolgen (DE)

( * ) Notice: Subject to any disclaimer, the term of this patent is extended or adjusted under 35 U.S.C. 154(b) by 0 days.

(21) Appl. No.: 09/835,092

(22) Filed: Apr. 16, 2001

(65) Prior Publication Data

US 2002/0149167 A1 Oct. 17, 2002

(30) Foreign Application Priority Data

Apr. 15, 2000 (DE) .......................... 100 18 776

(51) Int. Cl.$^7$ ...................... B60G 21/055; B60G 11/20; F16F 1/16
(52) U.S. Cl. ............................. 280/124.107; 267/189; 267/276; 267/141.2
(58) Field of Search .................. 280/124.107, 124.137, 280/124.152; 267/188, 189, 276, 293, 141.2

(56) References Cited

U.S. PATENT DOCUMENTS

| 4,033,605 A | * | 7/1977 | Smith et al. .......... 280/124.137 |
| 4,243,247 A | * | 1/1981 | Kataoka .................... 267/276 |
| 4,415,178 A | * | 11/1983 | Hatsushi et al. ...... 280/124.152 |
| 4,600,072 A | * | 7/1986 | Krude ........................ 180/348 |

FOREIGN PATENT DOCUMENTS

| DE | 28 17 712 A1 | | 10/1979 |
| DE | 39 04 833 C1 | | 3/1990 |
| DE | 44 45 995 | * | 4/1996 |
| EP | 0 384 799 | * | 8/1990 |
| GB | 2 021 053 A | | 11/1979 |
| JP | 4-349012 | * | 12/1992 |

* cited by examiner

*Primary Examiner*—Peter C. English
(74) *Attorney, Agent, or Firm*—Crowell & Moring LLP

(57) ABSTRACT

A bearing has an elastic bearing element and envelops a vehicle wheel suspension stabilizer. The elastic bearing element with an inner sleeve is disposed on the stabilizer. The bearing element can be connected in a rotationally secure manner to the stabilizer by corresponding locking elements between the inner sleeve and the stabilizer.

21 Claims, 1 Drawing Sheet

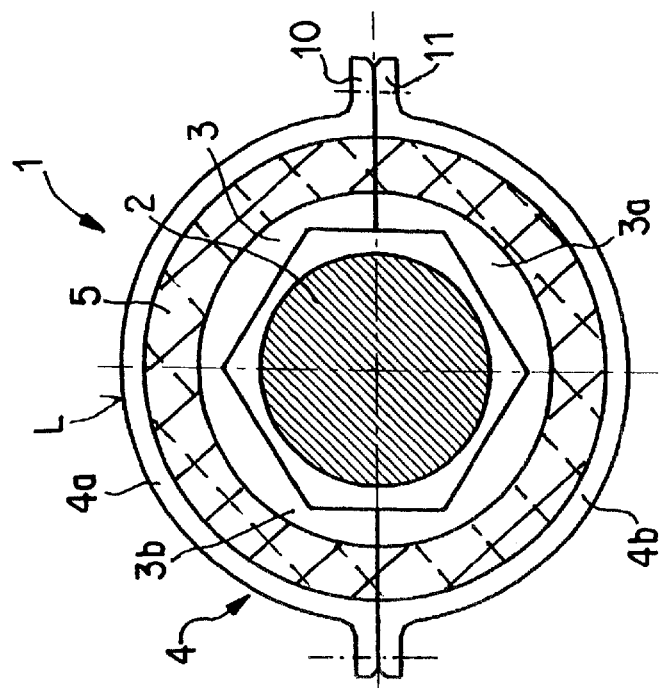
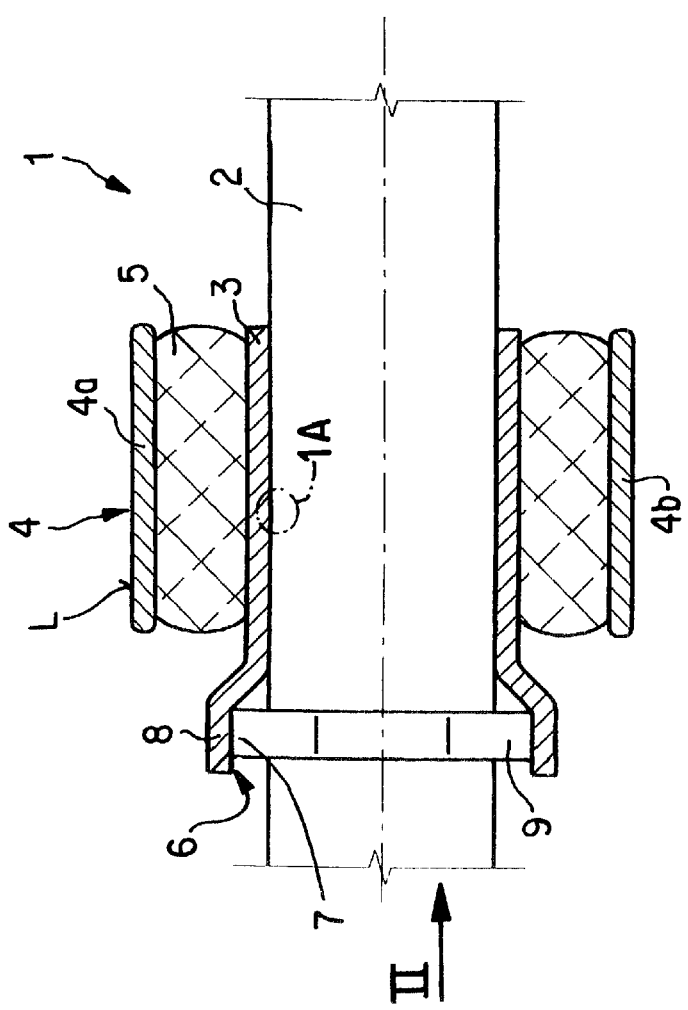
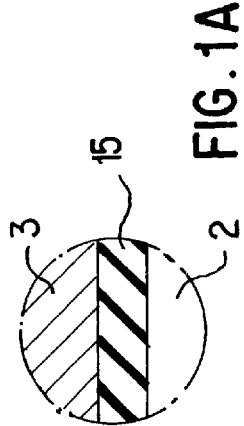
FIG. 1
FIG. 1A
FIG. 2

BEARING FOR A STABILIZER OF A WHEEL SUSPENSION FOR MOTOR VEHICLES AND METHOD OF MAKING SAME

This application claims the priority of German application No. 10018776.5, filed Apr. 15, 2000.

BACKGROUND AND SUMMARY OF THE INVENTION

The invention relates to a bearing for a stabilizer of a wheel suspension for motor vehicles.

The German Patent Document DE 39 04 833 C1 discloses a bearing for a stabilizer of a wheel suspension for motor vehicles. Said bearing exhibits on the stabilizer a guide ring, which is overlapped by an elastic bearing body. It is connected in a fixed manner to the body of the motor vehicle and induces, together with the guide ring, an exact guide of the stabilizer in the transverse direction. Moreover, German Patent Document DE 28 17 712 A1 (corresponding British application GB 2 021 053A) discloses a connecting element for a stabilizer to stabilize the rolling action. Said connecting element comprises two sleeves, which are connected together by means of a toothing and which are attached to the stabilizer ends to be connected.

An object of the invention is to provide a bearing for a stabilizer of a wheel suspension. Said bearing is dirt resistant and noiseless and also enables easy mounting on the stabilizer.

The invention achieves this object according to preferred embodiments of the invention by providing a bearing for a stabilizer of a wheel suspension for motor vehicles, said bearing comprising an elastic bearing element, which envelops the stabilizer at a bearing point and which in use is rigidly connected to a body member of the motor vehicle, wherein the elastic bearing element with an inner sleeve is disposed on the stabilizer; and wherein the bearing element can be connected in a rotationally secure manner to the stabilizer by corresponding locking elements between the inner sleeve and the stabilizer.

Further advantageous features of preferred embodiments of the invention are described herein and in the claims.

Advantages, targeted primarily with the invention, lie in the fact that a rotationally fixed connection of the stabilizer with the bearing element by locking elements will prevent relative movements between the stabilizer and the sliding surfaces of the bearing element and thus eliminate squeaking noises.

A rotationally fixed connection is achieved, according to preferred embodiments of the invention, in that the inner sleeve exhibits a free, protruding sleeve segment with a polygonal internal shape as the first locking element, which overlaps a ring, which is connected to the stabilizer and which exhibits a polygonal external shape as the second locking element. According to the invention, the locking elements can comprise corresponding multiple toothed profiles or multiple cornered profiles. Thus, the invention produces in a simple manner a shape lock between the stabilizer and the bearing element. All contours that are suitable for the transfer of moments, such as multiple toothed profiles, two cornered, six cornered or eight cornered profiles, can be used as the external contour. In this respect alternative embodiments are contemplated where the ring is pressed onto the stabilizer and where it is a plastic ring that is molded on.

In particular, an elastic ring element between the inner sleeve and the outer sleeve of the bearing element makes it possible to twist the stabilizer. This ring element is vulcanized, for example, onto the inner and the outer sleeve.

According to the invention, the outer sleeve is rigidly connected to the body or chassis of a motor vehicle or to the chassis auxiliary frame. For ease of assembly the outer sleeve and/or the inner sleeve comprise(s) two shells, where the shells exhibit stops, by means of which an attachment takes place.

The elastic ring element between the sleeves brings about a defined distance and permits a bearing that is simultaneously both radially rigid and slightly rotational.

To coordinate the tolerances, the invention provides a layer of rubber or a layer exhibiting an identical effect between the inner sleeve and the stabilizer.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross sectional front view of a bearing element constructed according to preferred embodiments of the invention, and FIG. 1A is an enlarged cross sectional view of portion 1A of FIG. 1; and FIG. 2 is a view of the stabilizer with bearing element as seen in the direction of arrow II of FIG. 1.

DETAILED DESCRIPTION OF THE DRAWINGS

A bearing 1 for a stabilizer 2 comprises in essence a bearing element L, comprising an inner sleeve 3, an outer sleeve 4 and an elastic ring element 5, disposed between the sleeves 3 and 4. A rotationally fixed connection between the bearing element L and the stabilizer 2 is achieved by corresponding locking elements 6, 7 on the inner sleeve 3 and the stabilizer 2.

To this end, the inner sleeve 3 exhibits on a free end 8 a polygonal internal shape as the locking element 6. It can comprise multiple teeth or multiple corners. This internal shape (locking element 6) overlaps a ring 9, which is rigidly connected to the stabilizer 2. The external edge of this ring 9 is provided with the other locking element 7, which comprises a polygonal external shape, which is designed to correspond with the internal shape of the inner sleeve 3.

This mating of the two locking elements 6 and 7 of the inner sleeve 3 and the ring 9 produces a secure, rotationally fixed connection between the bearing element L and/or the bearing 1 and the stabilizer 2. Instead of the ring 9, the stabilizer 2 can also exhibit an appropriate external shape with the locking element 7.

The elastic element 5 between the sleeves 3 and 4 can be connected to said sleeves by means of vulcanization or in any other manner. It extends over a part of the length of the inner sleeve 3; and the free end 8 of the inner sleeve 3 is exposed and exhibits the locking element 6. The elastic element 5 enables a twisting or torsional movement of the stabilizer 2 during the spring actions of the motor vehicle.

The outer sleeve 4 can comprise at least two shells 4a and 4b, which exhibit stops or side flanges 10 and 11, by means of which a connection of the bearing element L takes place.

The cylindrical internal surface of the inner sleeve 3, apart from the free end 8, envelops the stabilizer 2 and is not connected to it. An intermediate layer 15, made for example of rubber, or a similar layer can be provided between the internal surface and the stabilizer 2 so that the tolerances can be balanced and so that external influences, like water, etc., cannot penetrate between this internal surface and the stabilizer.

The ring 9 can be made of plastic or metal and can be connected to the stabilizer 2 by means of injection molding or by pressing on.

According to the invention, the inner sleeve 3 and also the outer sleeve 4 can be designed as multiple shells, for example two shells (shell 3a, 3b), so that mounting on the stabilizer 2 is simplified. The bearing 1 is mounted on the ring 9 in a simple manner by pulling over the ring 9 or in the case of two shells 3a and 3b by suitably overlaying so that the locking element 6 of the inner sleeve 3 can engage with the locking element 7 of the ring 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A bearing for a stabilizer of a wheel suspension for a motor vehicle, having an elastic bearing element which reaches around the stabilizer at a bearing point and which is fixedly connected with a vehicle body part, the elastic bearing element comprising:

an inner sleeve on the stabilizer, mutually corresponding locking elements provided on the inner sleeve and the stabilizer by which the inner sleeve is non-rotatably connected with the stabilizer, a first of said locking elements defined by a freely projecting sleeve section at an end of the inner sleeve with a polygonal interior shape, a second of said locking elements defined by a ring connected with the stabilizer and having a polygonal exterior shape, the first of said locking elements reaching over the second of the locking elements, and an elastic ring element which is vulcanized between the inner sleeve and an outer sleeve, the ring element extending at least partially along a length of the inner sleeve.

2. The bearing according to claim 1, wherein the locking elements have mutually corresponding multiple cornered profiles.

3. The bearing according to claim 2, wherein at least one of the inner sleeve and the outer sleeve is formed by at least two shells, and wherein the outer sleeve has side flanges which can be connected with one another.

4. The bearing according to claim 2, and further comprising an elastic intermediate layer arranged between the inner sleeve and the stabilizer.

5. The bearing according to claim 2, wherein the ring is formed of a plastic material and is injection molded onto the stabilizer.

6. The bearing according to claim 2, wherein the ring is pressed onto the stabilizer.

7. The bearing according to claim 2, wherein the inner sleeve has a cylindrical surface surrounding the stabilizer.

8. The bearing according to claim 1, wherein at least one of the inner sleeve and the outer sleeve is formed by at least two shells, and wherein the outer sleeve has side flanges which can be connected with one another.

9. The bearing according to claim 8, and further comprising an elastic intermediate layer arranged between the inner sleeve and the stabilizer.

10. The bearing according to claim 8, wherein the ring is formed of a plastic material and is injection molded onto the stabilizer.

11. The bearing according to claim 8, wherein the ring is pressed onto the stabilizer.

12. The bearing according to claim 8, wherein the inner sleeve has a cylindrical surface surrounding the stabilizer.

13. The bearing according to claim 1, and further comprising an elastic intermediate layer arranged between the inner sleeve and the stabilizer.

14. The bearing according to claim 13, wherein the ring is formed of a plastic material and is injection molded onto the stabilizer.

15. The bearing according to claim 13, wherein the ring is pressed onto the stabilizer.

16. The bearing according to claim 13, wherein the inner sleeve has a cylindrical surface surrounding the stabilizer.

17. The bearing according to claim 1, wherein the ring is formed of a plastic material and is injection molded onto the stabilizer.

18. The bearing according to claim 17, wherein the inner sleeve has a cylindrical surface surrounding the stabilizer.

19. The bearing according to claim 1, wherein the ring is pressed onto the stabilizer.

20. The bearing according to claim 19, wherein the inner sleeve has a cylindrical surface surrounding the stabilizer.

21. The bearing according to claim 1, wherein the inner sleeve has a cylindrical surface surrounding the stabilizer.

* * * * *